United States Patent [19]

Morikawa

[11] 4,167,484

[45] Sep. 11, 1979

[54] OZONE GENERATING APPARATUS

[75] Inventor: Masahiro Morikawa, Amagasaki, Japan

[73] Assignee: Mitsubishi Denki Kabushiki Kaisha, Tokyo, Japan

[21] Appl. No.: 758,150

[22] Filed: Jan. 10, 1977

Related U.S. Application Data

[63] Continuation of Ser. No. 627,193, Oct. 30, 1975, abandoned.

[30] Foreign Application Priority Data

Oct. 30, 1974 [JP] Japan ............................. 49-125646

[51] Int. Cl.² .................... B01K 1/00; C01B 13/10; C01B 13/11
[52] U.S. Cl. .................................. 250/533; 204/176; 250/436
[58] Field of Search ................ 23/281; 250/533, 436; 204/176; 423/581; 55/62, 33; 422/186

[56] References Cited

U.S. PATENT DOCUMENTS 3,663,418  5/1972  Kawahata ........................... 250/533

Primary Examiner—Morris O. Wolk
Assistant Examiner—Bradley Garris
Attorney, Agent, or Firm—Oblon, Fisher, Spivak, McClelland & Maier

[57] ABSTRACT

An ozone generating apparatus which comprises a plurality of chambers filled with an adsorbent, wherein a wet raw air is fed through one of the chambers filled with the adsorbent to adsorb moisture to form a dry air and the dry air is fed into an ozonizer to convert it into a dry ozone-containing air, and all or part of the dry ozone-containing air is fed into the other chamber filled with the adsorbent to purge water adsorbed on the adsorbent and to discharge it as a wet ozone containing air. The valves are then switched to feed the wet air to the other chamber filled with the adsorbent, whereby the moisture is adsorbed and the dry ozone-containing air fed from the ozonizer is fed into the former chamber filled with the adsorbent to reactivate the adsorbent and to discharge it as the wet ozone-containing air. The cycle is continuously repeated by switching valves.

1 Claim, 2 Drawing Figures

OZONE GENERATING APPARATUS

This is a continuation, of application Ser. No. 627,193, filed Oct. 30, 1975 now abandoned.

BACKGROUND OF THE INVENTION

1. Field of the Invention

The present invention relates generally to a novel ozone generating apparatus having a moisture exchanger, and especially one for decreasing the consumption of electric power utilized in drying a gas, such as air or oxygen, by using a dry ozone-containing gas for a recovery of adsorbent in an adsorption type air dryer.

2. Description of the Prior Art

In FIG. 1, there is shown a schematic view of a conventional ozone generating apparatus, wherein a silent discharge ozonizer 1 is connected to an air dryer 2, which uses a solid adsorbent or desiccant, such as a synthetic zeolite or a molecular sieve, active alumina, silica gel or the like, and which in turn is connected to a blower 3, as an air compressor or air blower, through a cooler 4 for the air, such as water cooling type or a freezing type cooler. Adsorption chambers 5 and 6, filled with a solid adsorbent, are disposed within the air dryer 2 being provided with three-way electromagnetic valves 7 and 8, respectively, at one end thereof and two-way electromagnetic valves 8 and 10, respectively at their other ends. A valve 11 for by-passing dry air or providing a slow leak is disposed between the respective other ends of the adsorption chambers 5 and 6 and the valves 9 and 10 thereof. An inlet pipe 12 is provided for feeding air into the dryer from the cooler 4, and an outlet gas pipe 25 is provided for discharging dry air from the air dryer to the ozonizer 1, which has an outlet pipe 26 for an ozone-containing gas of the ozonizer. The reference numerals 27 and 28 respectively designate exhaust pipes for discharging a purge gas used for a recovery of the adsorbent in the adsorption chambers 5 and 6. In the Figure, full arrow lines designate directions of flow of the air and the ozone-containing air in the conditions that the adsorption chamber 5 of the dryer is in a drying or adsorbing step and the adsorption chamber 6 is in a recovering or desorbing step, while the broken arrow lines designate the opposite directions of flow wherein adsoprtion chamber 5 is in a recovering step and the adsorption chamber 6 is in a drying step.

It is necessary to dry the air for the ozonizer 1 because improvement of the ozone generating coefficient and of the life of the ozonizer is thus attained. Accordingly, in the conventional system of FIG. 1, the air fed from the blower 3 is cooled in the air cooler 4 to a suitable degree, which is lower than a predetermined temperature of the dryer to form a dry air having a dew point lower than about −40° C. in the air dryer 2, and then the air is fed to the ozonizer 1, to convert it to the ozone containing gas, and the ozone containing gas is then fed through the outlet pipe 26 to a part making use of it. The conventional air dryer for an ozonizer, which is commonly used, comprises two or more adsorption chambers being filled with a solid adsorbent which are in an automatic recovery system so that a dry air is continuously discharged while alternating the absorbing step and the adsorbent recovering step between the adsorption chambers.

As a manner of recovery of adsorbent, there are two systems, one wherein a reduced pressure-purge gas recovery system is provided in which half of each cycle is spent for adsorbing or drying under a high pressure at room temperature and half on reactivation under a reduced, or about atmospheric pressure and at room temperature purging a flow of a portion of the dried gas by-passed froom the chamber outlet in a drying step, and secondly, wherein a heating reactivation system is provided in which half of each cycle is spent for adsorbing at room temperature under atmospheric pressure and half on reactivation by heating at high temperature under ca. 1 atm., that is, a heated purge gas is passed through the adsorbent or a purge gas is passed through a heated adsorbent. The dryer for the former system is referred to as a pressure swing system dryer, or a heatless dryer, and the dryer for the latter system is referred to as a thermal swing system dryer, or a heat type dryer.

In the heatless dryer, a period of adsorption purge recovery can be decreased by about several minutes. Accordingly, the amount of the adsorbent is decreased and the size of the adsorption chamber, including the adsorption tower, can be minimized to a compact size,, and no heating is needed for reactivation or recovery of adsorbent, so that there is substantially no deterioration of the adsorbent, and it is thus advantageous with respect to the miantenance of the apparatus. However, the electric power required for drying in the heatless dryer is higher than that of the heat type dryer.

On the other hand, the heat type dryer requires less electric power for drying than does the heatless dryer. However, the heat type dryer requires a long period of adsorption-purge recovery, for example, several hours, as about 6 to 8 hours, and accordingly the size of the apparatus is large, and small amounts of organic materials in the air which are adsorbed on the surface of the adsorbent in the adsorbing step, are carbonized, polymerized or thermally decomposed, thus to deteriorate properties of the adsorbent, disadvantageously.

In the conventional ozone generating apparatus having the system of FIG. 1, a heatless dryer is used. Referring again to FIG. 1, the operation of the air drying part will now be described. First, the states of the valves and the directions of the air flow wherein the adsorption chamber 5 is in an adsorbing and drying step and the adsorption chamber 6 is in a purging and recovering step will be illustrated.

The three way valve 7 is in a closed state between pipes 13 and 27 and in an open state between pipes 13 and 15, so as to admit cool air to the adsorption chamber 5. The three way valve 8 is in a closed state between pipes 14 and 16 and in an open state between the pipe 16 and the purge gas outlet 28. The two way valve 9 is in an open state and the two way valve 10 is in a closed state. The valve 11 is set to a predetermined opening degree.

The compressed wet air fed from the pipe 12 is fed through pipe 13, through valve 7 and pipe 15 into the adsorption chamber 5, wherein the moisture is adsorbed and removed to form dry air, which then is fed to the outlet pipe 17. The dry air flow is divided here and one part is fed through the pipe 19, the two way valve 9, and the pipes 21 and 25 to the ozonizer 1 as dry air for ozone generation in a reduced pressure state, and the other part is fed through the piep 23, the valve 11, and the pipes 24 and 18 to the adsorption chambers 6 as the purge gas for a recovery of the adsorbent, in a reduced pressure state. The former is converted in the ozonizer into a dry ozone containing air which is fed through the pipe 26 or to the ozone using part or device. The latter operates to purge water from the adsorbent in the adsorption chamber 6 and to form a wet air, which is fed through the pipe 16 and the valve 8 and is then discharged from the purge gas outlet pipe 28 to the atmosphere. The directions of air flows are shown by full arrow lines. When the air flow condition is maintained for a long period, the adsorption rate in the adsorption chamber 5 increases to a super-saturated condition.

However, when a certain predetermined period, which is shorter than the period for super-saturation has passed, for example, 2 minutes, the positions of the valves are switched. The three way valve 7 then is in a closed state between the pipes 13 and 15 and in an open state between he pipes 15 and 27. The three way valve 8 is in an open state between the pipes 14 and 16 and in a closed state between the pipes 16 and 28. The valve 9 is in a closed state and the valve 10 is in an open state while the valve 11 is not changed. The wet air fed into the pipe 12 now is fed into the adsorption chamber 6, wherein water vapor is adsorbed under high pressure to dry the air. The dry air is fed to the pipe 18 wherein the dry air is divided. One part of the dry air is fed through the pipe 20, the two way valve 10 and the pipe 25 to the ozonizer 1 as the dry air for ozone generation, under a reduced pressure state. The other part is fed through the pipe 24 and the valve 11, and the pipes 23 and 17 to the adsorption chamber 5 as the purge gas for a recovery of the adsorbent under a reduced pressure state. The former is converted into the dry ozone-containing air and is fed through the pipe 26 to the ozone using part. The later is fed as the wet air from the adsorption chamber 5 through the pipe 15 and the valve 7 and is discharged from the purge gas outlet 27 to the atmosphere.

When the flow condition (the directions of air flows are shown by the broken arrow lines) is maintained for a predetermined period, such as two minutes, the valves are automatically switched so as to be in the condition wherein the adsorption chamber 5 is in an adsorbing and drying step and the adsorption chamber 6 is in a purging and recovering step. As stated above, the adsorption-purge of the adsorption chambers 5 and 6 are alternatively repeated in a constant cycle and the dry air is continuously fed into the ozonizer 1. As is clear from the illustration, in the conventional ozone generating apparatus shown in FIG. 1, it is necessary to feed not only an amount of air to the ozonizer 1 but also an amount of air for a recovery of the adsorbent into the air dryer 2. The problem is the same as that in the case of the heat type dryer.

In the embodiment of FIG. 1, it is necessary to design the adsorption chambers so as to dry all amounts of air fed into the dryer 2. In general, the cost of an ozone generating apparatus and the cost of operation are approximately similar to the total of the cost for drying raw air and the cost for the ozonizer 1. The proportion of the former cost for drying air among the total cost is high. In the case of operating cost, for example, providing the electric discharge power for feeding air in the ozonizer is 1, the electric power for drying the air is about 0.7 in the case of heatless dryers and about 0.4 in the case of heat type dryers.

SUMMARY OF THE INVENTION

It is therefore an object of the present invention to provide an ozone generating apparatus wherein electric power for drying air is saved by utilizing the dry ozone-containing gas for drying the air and the capacity of the blower and capacities of the adsorption chambers are decreased to minimize the size of the ozone generating apparatus, whereby the cost for the apparatus may be decreased.

The foregoing object and others as well are achieved by the ozone generating apparatus of the present invention, which comprises a plurality of chambers filled with an adsorbent, wherein a wet raw air is fed through one of the chamberozone-containing air, and all or part of the dry ozone-containing air is fed into the other chamber filled with the adsorbent to purge or reactivate water adsorbed on the adsorbent and to discharge it as a wet ozone-containing air to a device for using such ozone containing air, and then the valves are switched to feed the wet air to the other chamber filled with the adsorbent, whereby the moisture is adsorbed and the dry ozone-containing air fed from the ozonizer is fed into the former chamber filled with the adsorbent to reactivate the adsorbent and to discharge it as the wet ozone-containing air to the same device for using of ozone, and the cycle is repeated by switching the valves.

BRIEF DESCRIPTION OF THE DRAWINGS

Various other objects, features, and attendant advantages of the present invention will be more fully appreciated as the same becomes better understood from the following detailed description when considered in connection with the accompanying drawings, wherein like reference numerals designate like or corresponding parts throughout the several Figures, and in which.

DETAILED DESCRIPTION OF THE PREFERRED EMBODIMENT

Figure 2:
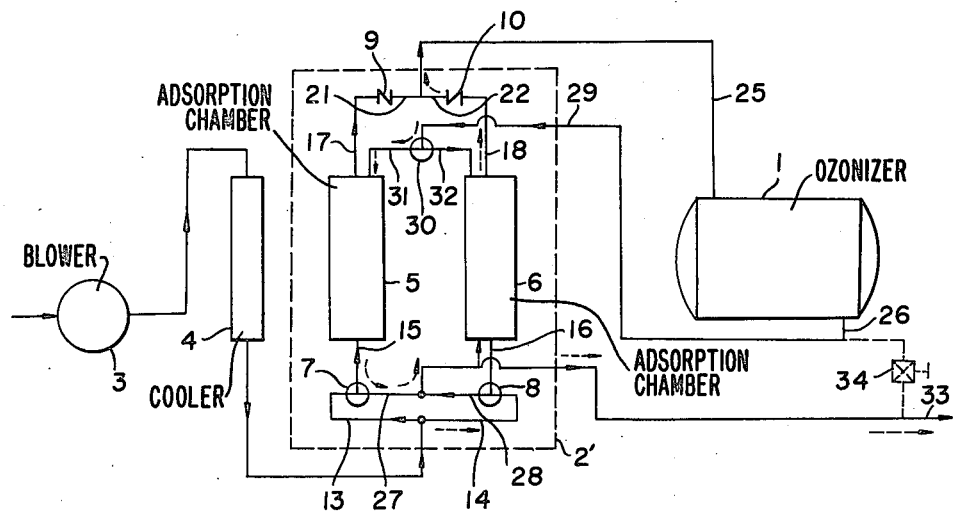
FIG. 2 is a schematic view of one embodiment of the system according to the present invention.

Referring now to FIG. 2, wherein one embodiment of the system of the present invention using a heatless reactivation system is illustrated, an inlet pipe 29 for purge gas, that is, a dry ozone-containing gas, connects the ozonizer outlet 26 to a three way valve 30, from which pipes 31 and 32 respectively feed the purge gas to the adsorption chambers 5 and 6. Pipes 27 and 29 are connected to each other and are also connected to a pipe 33 for feeding ozone-containing gas to the part making use thereof.

Figure 1:
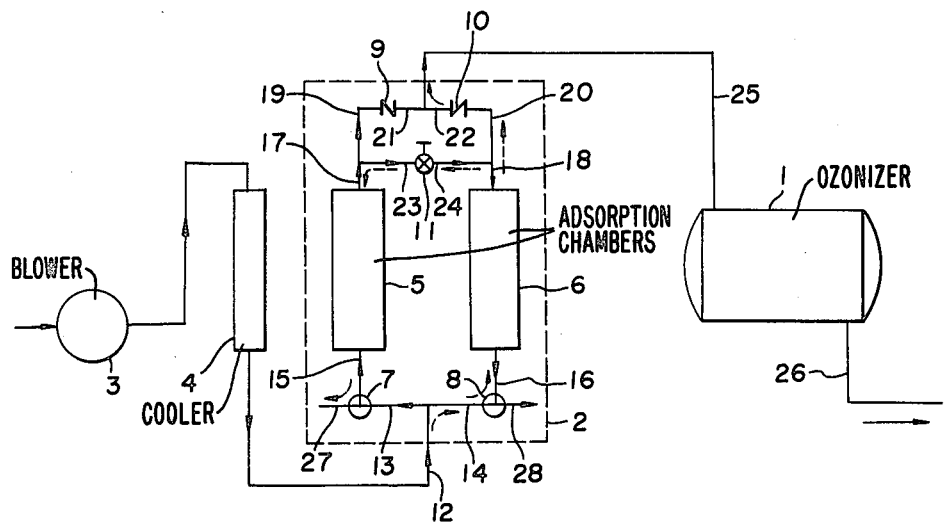
FIG. 1 is a schematic view of the system for drying air and generating ozone in conventional ozone generating apparatus, already described.

The other parts are the same as those of FIG. 1 and thus are not recited.

Thus, wet compressed air is fed by the blower 3 through the air cooler 4 to the inlet pipe 13 and is passed through the pipe 13, the vallve 7 and the pipe 15 to the adsorption chamber 5. During the period of passing through the adsorption chamber 5, moisture is adsorbed and removed to form the dry air, which is fed to the outer pipe 17. All of the dry air is fed through the valve 9 and the pipe 25 to the ozonizer 1, wherein it is converted into ozone-containing dry gas, which is fed to the outlet pipe 26 of the ozonizer. In the conventional system the dry ozone-containing gas is directly passed to the ozone using part. However, in the system of the present invention, the dry ozone-containing gas fed out to the pipe 26 is fed through the purge gas inlet pipe 29, the three way valve 30 and the purge gas inlet pipe 32 to the adsorption chamber 6 from the direction which is opposite to that of the adsorbing step.

In the adsorption chamber 6, the gas serves as the purge gas for a recovery of the adsorbent and to form a wet ozone-containing gas. The wet ozone-containing gas is fed through the pipe 16, the valve 8 and the pipe 28 to the pipe 33 for discharging the ozone-containing gas and is further fed to the ozone using part. Thus, the gas fows in the directions shown by the full arrow lines.

After maintaining this flow condition for a predetermined period, the three way valves 7, 8 and 30 are switched and the two way valve 9 is turned to a closed state and the two way valve 10 is turned to an open state, whereby the adsorption chamber 5 is in a recovering step and the adsorption chamber 6 is in an adsorbing step. The air is fed to the adsorption chamber 6 wherein adsorption under high pressure is caused to form the dry air.

The dry air is passed through the pipe 18 in the case and the valve 10 and is then fed to the ozonizer 1 under a reduced pressure. In the ozonizer 1. the dry air is converted into the dry ozone-containing gas, which is fed to the pipe 26. The dry ozone-containing gas passed through the pipe 26, the purge gas inlet pipe 29 and the valve 30 is fed through the purge gas inlet pipe 1 of the adsorption chamber 5, wherein the gas serves as the purge gas for recovery of the adsorbent and hus to form the wet ozone-containing gas. The wet ozone-containing gas is fed through pipe 15, the valve 7 and the pipe 27 to the pipe 33 for discharging the ozone-containing gas and is further fed to the ozone-using part. Thus, the gas flows in the directions shown by the broken arrow lines.

After maintaining this flow condition for a predetermined period, the valves in the dryer 2 are switched, whereby the adsorption chamber 5 is in the adsorbing step and the adsorption chamber 6 is in the recovering step. The operations are alternatively repeated, so that dry air is continuously fed in the ozone generating apparatus and is converted to the ozone-containing gas and the whole or a part of the gas seves as the purge gas for the recovery of the adsorbent and the wet ozone-containing gas is continuously fed to the ozone using part.

It is not always necessary to feed all of the dry ozone-containing gas, fed from the ozonizer 1 to the pipe 26, to the moisture exchanger 2' as the purge gas for recovery of the adsorbent, according to the conditions of the apparatus and the operation. Thus, when only a part of the gas is fed to the dryer, the remainder is directly fed from the pipe 26 through the flow control valve 34 connected in a shunt pipe or by-pass to the pipe 33, as shown by the dotted line. The ozone-containing gas fed from the dryer to the pipe 33 is not in a dry condition, but this causes no trouble since, when the ozone-containing gas is used for water treatment, it is unnecessary to be in a dry condition. When the ozone-containing gas is used for an air deodorant operation and air cleaning operations, e.g., denitrification and desulfurization of exhaust gas, it also is unnecessary to be in a dry condition. It also has been considered to decompose a part of the ozone at the surface of the solid adsorbent by passing it through the adsorption chamber for a recovery of the adsorbent. However, it has been confirmed that the loss of the ozone caused by passing the adsorption chamber can be neglected, because the ozone concentrations of the gases before and after passing the gases through the adsorption chamber. filled with a molecular sieve or a silica gel, at various temperatures of lower than 100° C. (average concentration for 1 hour) were measured by the standard ozone iodometric method to find that the concentrations of ozone are not different within an allowance of about ±5%.

This fact shows that the present invention can be applied for the ozone generating apparatus having a heat reactivation of adsorbent, by suitable design of the apparatus and under the consideration of the below mentioned effects of the invention.

The molecular sieve or silica gel filling the adsorption chamber has been used for removing moisture in air. Small amounts of organic compounds are usually included in atmospheric raw air, and will be also adsorbed on the molecular sieve or the silica gel, whereby an unfavorable condition is caused in the heat recovery to thereby shorten the life of the absorbent. When the ozone containing gas is passed through the solid adsorbent in accordance with the present invention, the ozone-containing gas, which has high oxidative property is passed in the recovery of the adsorbent, whereby the small amounts of the organic material adsorbed on the surface of the adsorbent can be decomposed to lower molecular compounds, having low boiling points, which are purged and the deterioration of the absorbent can thus be prevented. The small amounts of the decomposed products formed by the ozone oxidation do not cause any trouble in the usual ozone applications, such as in water treatment and in air treatment, even though the decomposed products are included in the ozone-containing gas.

Certain examples for showing the main effects of the invention will now be illustrated. The experiments were conducted by using the same absorbent in the flow system of FIGS. 1 and 2.

In the conventional system of FIG. 1, in the case of 57 Nl/min. of a flow rate of dry air (dew point of $-70°$ C.) to be fed to the ozonizer, the electric power for drying air under 7 kg/cm$^2$ operation pressure in the adsorption step and with a 20 l./min. purge rate (77 Nl/min. of the raw air fed to the adsorption chamber) was 1.13 KW. In accordance with the system of the invention of FIG. 2, the electric power for drying air under 5 kg/cm$^2$ operation pressure and with a purge rate of 57 Nl/min which is all of the raw air fed by the blower was 0.59 K.W. and the dew point of the dry air (57 Nl/min)) fed to the ozonizer was lower than $-70°$ C.

It was possible to by pass the ozone-containing gas by reducing the purge rate to less than 57 Nl/min. and it could be reduced to 33 Nl/min. in the present system. This suggests that the operation pressure might be reduced to lower than 5 kg/cm$^2$.

Other comparative include the following.

In the case of a 140 Nl/min. flow rate of dry air having a dew point of 40° C. (for feeding to the ozonizer) given under the same operation pressure (2.1 kg/cm$^2$) in the drying step in the conventional system of FIG. 1,, the electric power needed for obtaining a purge rate of 140 Nl/min with a blow rate of the blower of 280 Nl/min. was 2.01 KW under the condition using 2.8 Kg of the adsorbent. In the system of the invention of FIG. 2, the electric power for obtaining 140 Nl/min. of purge, with 140 Nl/min. of a blow rate of the blower was 1.19 KW under the condition of the same operation pressure in the drying step, 2.1 Kg/cm$^2$, using 1.4 Kg of the adsorbent, that is, only half of the coonventional system. It was possible to by pass the ozone containing gas by reducing the purge rate to less than 140 Nl/min, and it could be reduced to about 85 Nl/min. if desired. This suggests that the amount of adsorbent might be further reduced than 1.4 Kg or that the operation pressure might be reduced to lower than 2.1 Kg/cm$^2$.

As is clear from the illustration in accordance with the ozone generating apparatus of the present invention, the cost for drying air or oxygen (cost of electric power for operation and cost of apparatus) can be remarkably reduced and the cost for supplying ozone can be remarkably reduced by using the dry ozone-containing air or oxygen fed from the ozonizer for the recovery of the adsorbent. Accordingly, remarkable advantages can be obtained in practical operation.

Obviously, many modifications and variations of the present invention are possible in light of these teachings. It is to be understood therefore that within the scope of the appended claims, the invention may be practiced otherwise than as specifically described herein.

What is claimed as new and desired to be secured by letters patent of the United States is:

1. An ozone generating apparatus comprising:
   a moisture exchanger having at least two adsorbent-filled chambers, each of said chambers having an air supply inlet and an outlet;
   means for supplying a moist compressed air to said moisture exchanger; an ozonizer having an inlet and an outlet connected to said moisture exchanger for respectively receiving exclusively through said ozonizer inlet a dry gas dried in said moisture exchanger to convert the same into a dry ozone-containing gas for exclusive discharge through said ozonizer outlet;
   fluid flow control means for selectively, alternatively and successively connecting said air supply means to the inlet of a selected one of said at least two adsorbent-filled chambers, while simultaneously connecting the outlet of said selected one of said chambers to said ozonizer inlet, the outlet of said ozonizer to the outlet of another of said at least two adsorbent-filled chambers and the inlet of said another of said chambers to a conduit leading from said moisture exchanger to an ozone-using part, and connecting said air supplying means to the inlet of said another of said chambers to the inlet of said ozonizer, the outlet of said ozonizer to the outlet of said selected one of said chambers and the inlet of said selected one of said chambers to said conduit leading to said ozone using part, whereby said adsorbent-filled chambers of said moisture exchanger alternatively operate to perform an adsorbing step or a purging step; and
   a by-pass line between said ozonizer outlet and said conduit leading to said ozone using part and valve means therein for controlling the degree of said ozone-containing gas being formed in said ozonizer which is returned to said moisture exchanger as a purging gas and the degree of dry ozone-containing gas being formed in said ozonizer which is directly discharged to said ozone using part.

* * * * *

UNITED STATES PATENT AND TRADEMARK OFFICE
CERTIFICATE OF CORRECTION

PATENT NO. : 4,167,484
DATED : September 11, 1979
INVENTOR(S) : Masahiro Morikawa It is certified that error appears in the above-identified patent and that said Letters Patent are hereby corrected as shown below:

Colum 1, Line 29, change "8 and 10" to ---9 and 10---;

still Colum 1, Line 50 change "coefficient" to ---efficiency---.

Colum 2, Line 6, change "froom" to ---from---;

still Colum 2, Line 25 change "miantenance" to ---maintenance---.

Colum 3, Line 14, change "he pipes" to ---the pipes---.

Colum 4, Line 8, change "chambersone - contining air" to ---chamber---.

Colum 5, Line 25, change "and hus" to ---and thus---.

Colum 6, Line 53, change "40°C." to --- -4-°C.---.

Signed and Sealed this

*Twenty-fourth* Day of *June 1980*

[SEAL]

*Attest:*

SIDNEY A. DIAMOND

*Attesting Officer*  *Commissioner of Patents and Trademarks*